United States Patent
Lee et al.

(10) Patent No.: US 8,759,145 B2
(45) Date of Patent: Jun. 24, 2014

(54) ORGANIC LIGHT EMITTING DIODE DISPLAY AND MANUFACTURING METHOD THEREOF

(75) Inventors: Jaedo Lee, Gumi-si (KR); Younghee Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 908 days.

(21) Appl. No.: 12/868,134

(22) Filed: Aug. 25, 2010

(65) Prior Publication Data

US 2011/0050648 A1    Mar. 3, 2011

(30) Foreign Application Priority Data

Aug. 27, 2009    (KR) .................. 10-2009-0079937

(51) Int. Cl.
*H01L 51/40*    (2006.01)

(52) U.S. Cl.
USPC ............................................ 438/99; 345/175

(58) Field of Classification Search
USPC ................. 438/99; 345/173–175; 349/58
See application file for complete search history.

(56) References Cited

FOREIGN PATENT DOCUMENTS

| | | |
|---|---|---|
| CN | 101261379 | 9/2008 |
| JP | 2004-117646 A | 4/2004 |
| JP | 2008083496 A | 4/2008 |
| KR | 10-2007-0110988 A | 11/2007 |
| KR | 10-2008-0073559 A | 8/2008 |
| TW | 200739400 | 10/2007 |

*Primary Examiner* — Jack Chen
(74) *Attorney, Agent, or Firm* — McKenna Long & Aldridge LLP

(57) ABSTRACT

An organic light emitting diode display comprises: a display panel; a touch screen panel disposed on a display surface of the display panel; a sensing unit for sensing a position through the touch screen panel; and a polarizing plate disposed on the touch screen panel, wherein the touch screen panel is attached to the display surface area of the display panel with an air layer provided therebetween.

18 Claims, 9 Drawing Sheets

ORGANIC LIGHT EMITTING DIODE DISPLAY AND MANUFACTURING METHOD THEREOF

This application claims the benefit of Korean Patent Application No. 10-2009-0079937 filed on Aug. 27, 2009, which is hereby incorporated by reference for all purposes as if fully set forth therein.

BACKGROUND

1. Field of Invention

This document relates to an organic light emitting diode display and a manufacturing thereof.

2. Related Art

An organic light emitting element used for an organic light emitting diode display is a self-emission element in which a light emitting layer is formed between two electrodes disposed on a substrate. The organic light emitting diode display is divided into a top-emission type, a bottom-emission type, and a dual-emission type according to a light emission direction. The organic light emitting diode display is divided into a passive matrix type and an active matrix type according to a driving method.

A subpixel disposed in the organic light emitting diode display comprises a transistor unit including a switching transistor, a driving transistor, and a capacitor and an organic light emitting diode including a lower electrode connected to the driving transistor included in the transistor unit, an organic light emitting layer, and an upper electrode.

In the organic light emitting diode display, a scan signal, a data signal, a power, etc. are supplied to a plurality of subpixels arranged in a matrix format and light is emitted from the selected subpixels, thereby displaying an image. The organic light emitting diode display is advantageous in that it can be realized as a thin display device. Much research has been recently made to add a touch screen function to thin display devices such as the organic light emitting diode display.

However, the conventional organic light emitting diode display with a touch screen function has problems, such as degradation in visibility and exposure of transparent electrodes, due to a difference in reflected light caused by a difference in refractive index between an area in which the transparent electrodes for performing the touch screen function are formed and an area in which no transparent electrodes are formed. Thus, improvement thereof is required.

SUMMARY

An aspect of this document is to provide an organic light emitting diode display comprising: a display panel; a touch screen panel disposed on a display surface of the display panel; a sensing unit for sensing a position through the touch screen panel; and a polarizing plate disposed on the touch screen panel, wherein the touch screen panel is attached to the display surface area of the display panel with an air layer provided therebetween.

Another aspect of this document is to provide a manufacturing method of an organic light emitting diode display, the method comprising: forming a display panel; forming a touch screen panel on a display surface of the display panel; forming a sensing unit to sense a position through the touch screen panel; and forming a polarizing plate on the touch screen panel, wherein the touch screen panel is attached to the display surface area of the display panel with an air layer provided therebetween.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention.

DETAILED DESCRIPTION

Reference will now be made in detail to embodiments of the invention, examples of which are illustrated in the accompanying drawings.

Hereinafter, a concrete example according to an embodiment of the present invention will be described with reference to the attached drawings.

Figure 1:
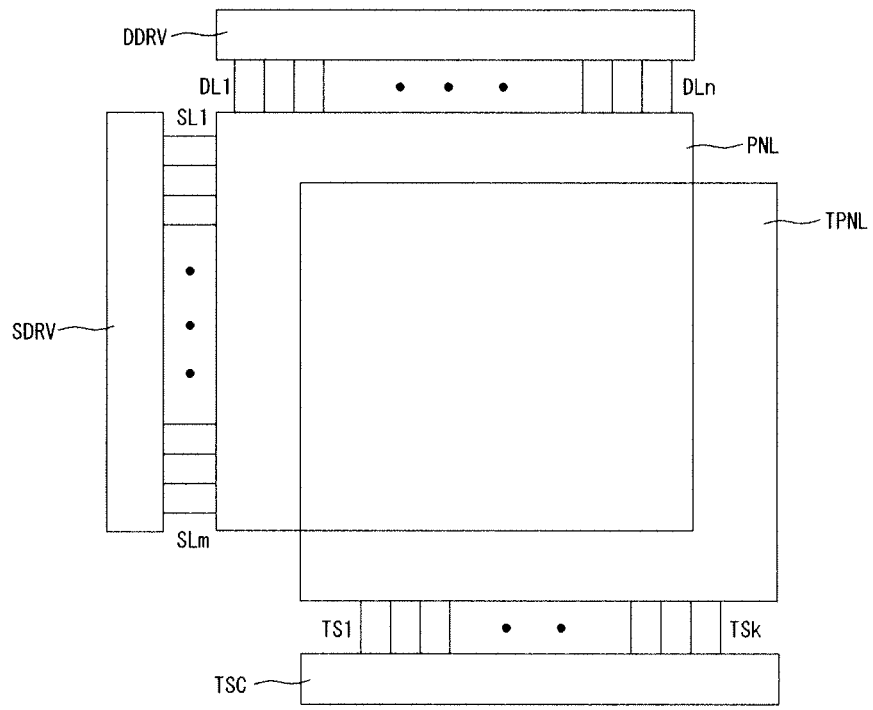
FIG. 1 is a schematic block diagram of an organic light emitting diode display according to one exemplary embodiment of the present invention.

Referring to FIG. 1, an organic light emitting diode display according to one exemplary embodiment of the present invention comprises a display panel PNL, a touch screen panel TPNL, a scan driver SDRV, a data driver DDRV, and a sensing unit TSC.

Although the display panel PNL may comprise a flat panel display FPD, such as an organic light emitting diode display panel, a liquid crystal display panel, and a plasma display panel, this exemplary embodiment takes the organic light emitting diode display panel as an example. The scan driver SDRV supplies scan signals to scan lines SL1 . . . SLm connected to subpixels included in the display panel PNL. The data driver DDRV supplies data signals to data lines DL1 . . . DLn connected to the subpixels included in the display panel PNL. The touch screen panel TPNL is disposed on a display surface of the display panel PNL. The sensing unit TSC senses a position touched by a user through lines TS1 . . . TSk connected to the touch screen panel TPNL.

Figure 2:
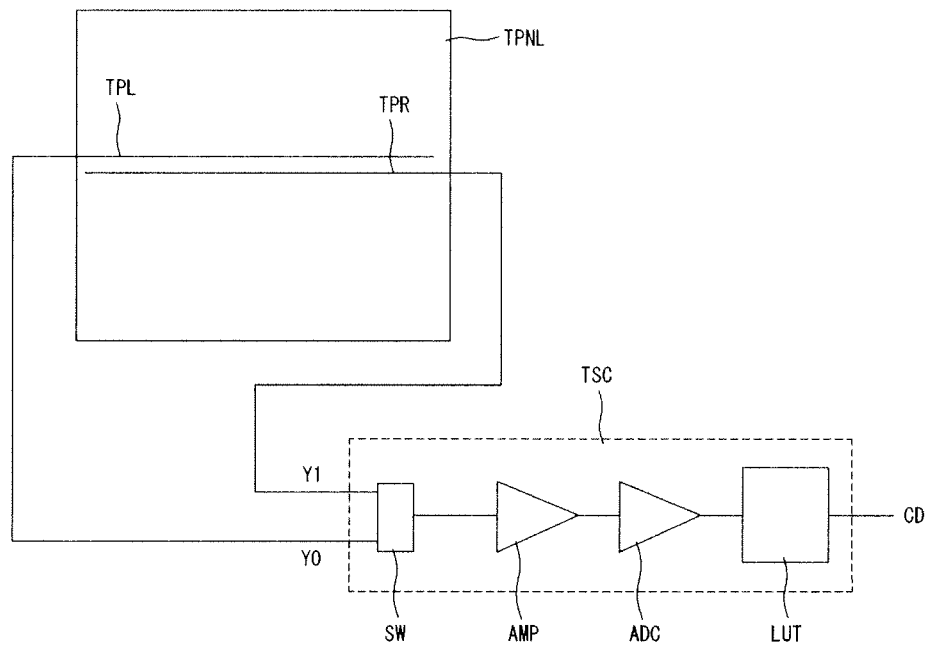
FIG. 2 is a block diagram for explaining a touch screen panel having a single-layer structure and a sensing unit.

Referring to FIG. 2, the sensing unit TSC is connected to transparent electrodes TPL and TPR included in the touch screen panel TPNL. When the user touches the touch screen panel TPNL, the sensing unit TSC recognizes a change in the capacitance of the transparent electrodes TPL and TPR included in the touch screen panel TPNL and senses the touched position. This exemplary embodiment will be described with respect to an example in which the touch screen panel TPNL and the sensing unit TSC are formed in a projected capacitance type, but the present invention is not limited thereto.

The sensing unit TSC may comprise, for example, a signal input part SW, a signal amplifier AMP, a signal converter, and a signal detector LUT, but this invention is not limited thereto. The signal input part SW receives signals through lines Y0 and Y1 connected to the transparent electrodes TPL and TPR disposed in the touch screen panel TPNL. The signal amplifier AMP amplifies the signals received by the signal input unit SW. The signal converter ADC converts the signals input as analog signals into digital signals. The signal detector LUT detects positional data indicative of where the user has touched by recognizing a change in capacitance, and transmits the detected positional data to a device CD where the data is used.

As explained above, the sensing unit TSC can sense a touched position by recognizing a change in the capacitance of the transparent electrodes TPL and TPR included in the touch screen panel TPNL, and the structure of the transparent electrodes TPL and TPR is as follows.

Figure 3:
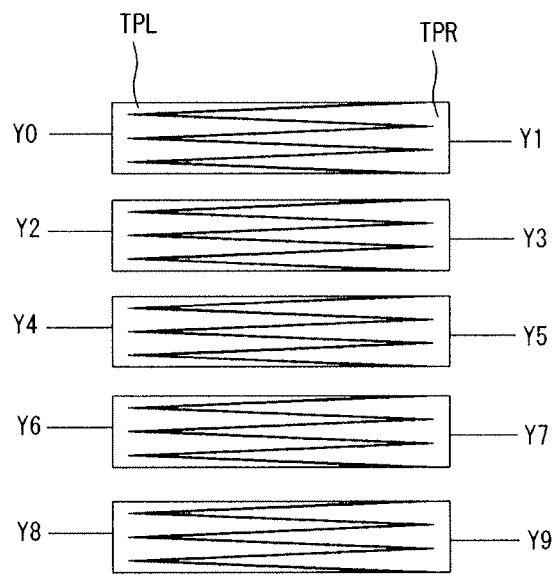
FIGS. 3 and 4 are illustrations of the structure of the touch screen panel having a single-layer structure.
Figure 4:
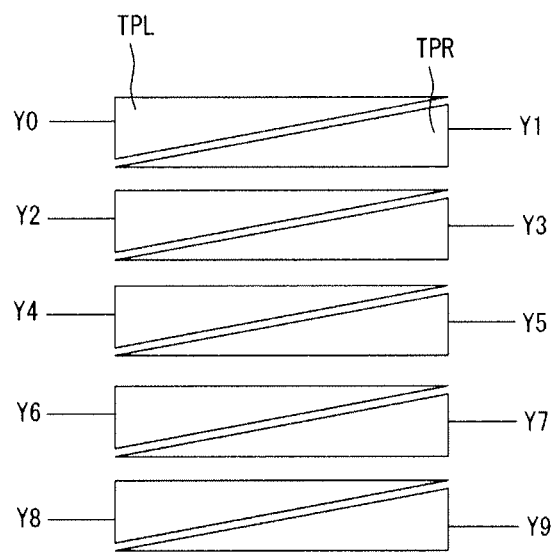

Referring to FIGS. 3 and 4, the transparent electrodes TPL and TPR comprise first transparent electrodes TPL arranged so as to be divided from the left of the touch screen panel TPNL to the right thereof and second transparent electrodes TPR arranged so as to be divided from the right of the touch screen panel TPN to the left thereof. The first transparent electrodes TPL and the second transparent electrodes TPR may be patterned with an alignment pattern in which they are disposed on the same layer and spaced apart at predetermined intervals and their area is varied. Then, as shown in the drawings, the first transparent electrodes TPL and the second transparent electrodes TPR may be patterned to have different capacitances from each other. The transparent electrodes TPL and TPR thus formed on the touch screen panel TPNL are connected to the sensing unit TSC through lines Y0 . . . Y0. FIGS. 3 and 4 are merely illustrated to facilitate the understanding of the configuration of the transparent electrodes TPL and TPR, but the present invention is not limited thereto.

Figure 5:
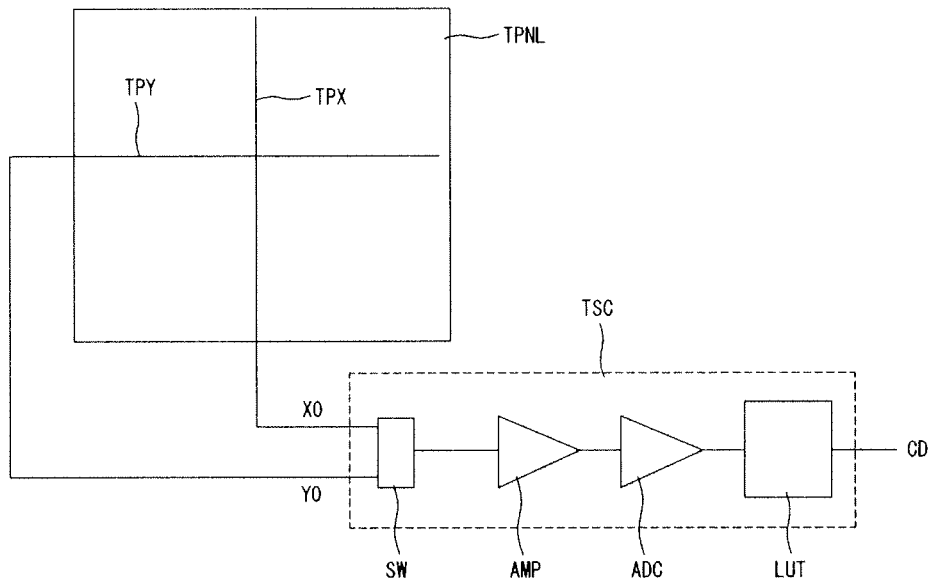
FIG. 5 is a block diagram for explaining a touch screen panel having a multi-layer structure and a sensing unit.

Referring to FIG. 5, the sensing unit TSC is connected to the transparent electrodes TPY and TPX included in the touch screen panel TPNL. When the user touches the touch screen panel TPNL, the sensing unit TSC recognizes a change in the capacitance of the transparent electrodes TPY and TPX included in the touch screen panel TPNL and senses the touched position. This exemplary embodiment will be described with respect to an example in which the touch screen panel TPNL and the sensing unit TSC are formed in a projected capacitance type, but the present invention is not limited thereto.

The sensing unit TSC may comprise, for example, a signal input part SW, a signal amplifier AMP, a signal converter, and a signal detector LUT, but this invention is not limited thereto. The signal input part SW receives signals through lines Y0 and Y1 connected to the transparent electrodes TPY and TPX disposed in the touch screen panel TPNL. The signal amplifier AMP amplifies the signals received by the signal input unit SW. The signal converter ADC converts the signals input as analog signals into digital signals. The signal detector LUT detects positional data indicative of where the user has touched by recognizing a change in capacitance, and transmits the detected positional data to a device CD where the data is used.

As explained above, the sensing unit TSC can sense a touched position by recognizing a change in the capacitance of the transparent electrodes TPY and TPX included in the touch screen panel TPNL, and the structure of the transparent electrodes is as follows.

Figure 6:
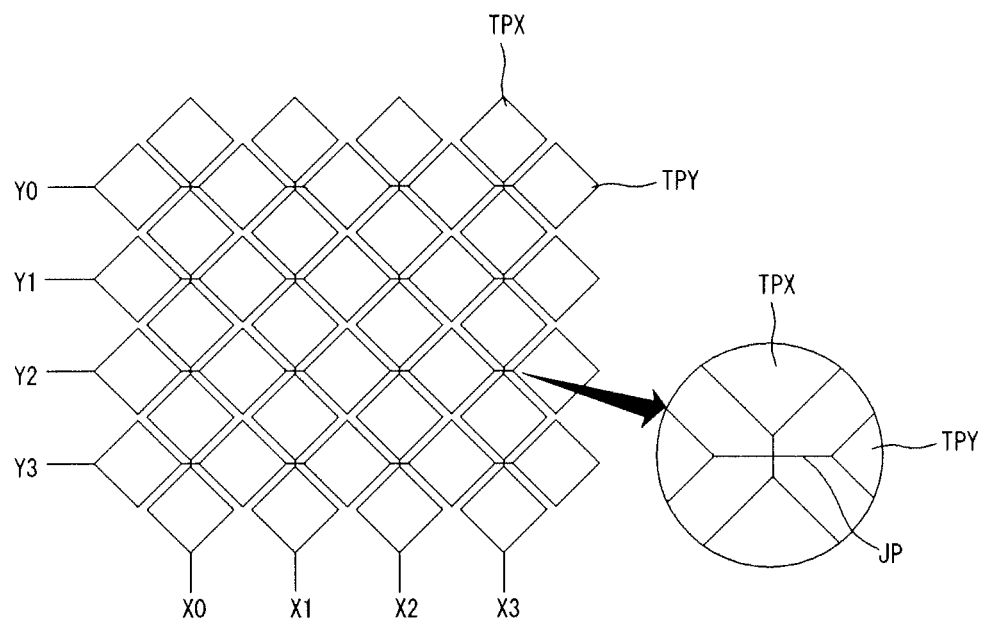
FIGS. 6 to 9 are illustrations of the structure of the touch screen panel having a multi-layer structure.

Referring to FIG. 6, the transparent electrodes TPY and TPX comprise first transparent electrodes TPY arranged so as to be divided in a first axial direction and second transparent electrodes TPX arranged so as to be divided in a second axial direction. The first transparent electrodes TPY and the second transparent electrodes TPX may be patterned to be disposed on different layers, and the patterned first and second transparent electrodes TPY and TPX may be connected to each other by jumper electrodes JP. The first transparent electrodes TPY and the second transparent electrodes TPX are connected to the sensing unit TSC through lines Y0 . . . Y3 and X0 . . . X3.

Figure 7:
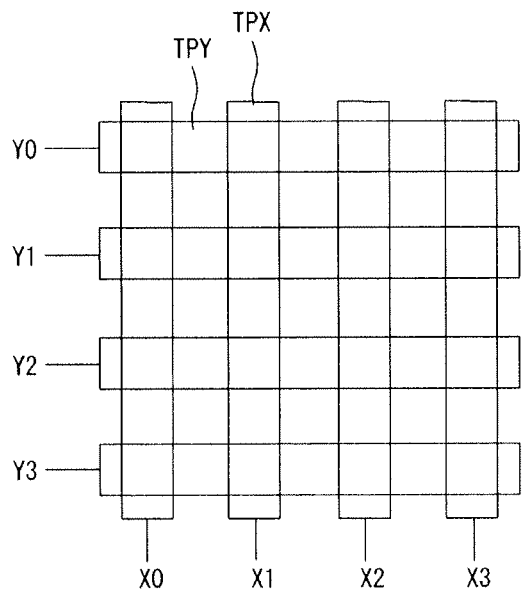

Referring to FIG. 7, the transparent electrodes TPY and TPX comprise first transparent electrodes TPY arranged so as to be divided in a first axial direction and second transparent electrodes TPX arranged so as to be divided in a second axial direction. The first transparent electrodes TPY and the second transparent electrodes TPX may be patterned to be disposed on different layers so as to cross each other. The first transparent electrodes TPY and the second transparent electrodes TPX are connected to the sensing unit TSC through lines Ym and X0 . . . X3.

Figure 8:
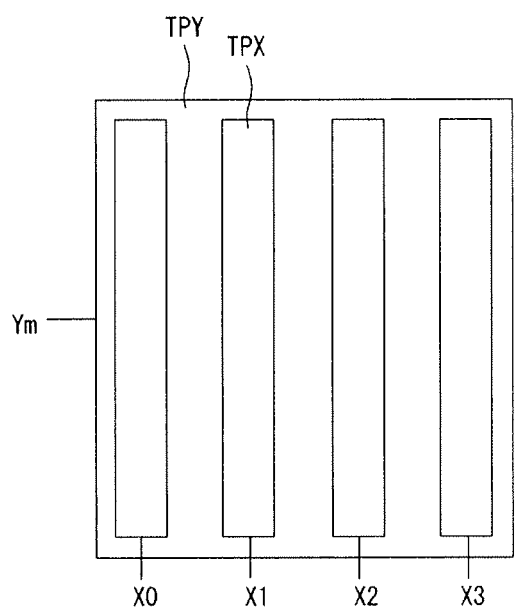
Figure 9:
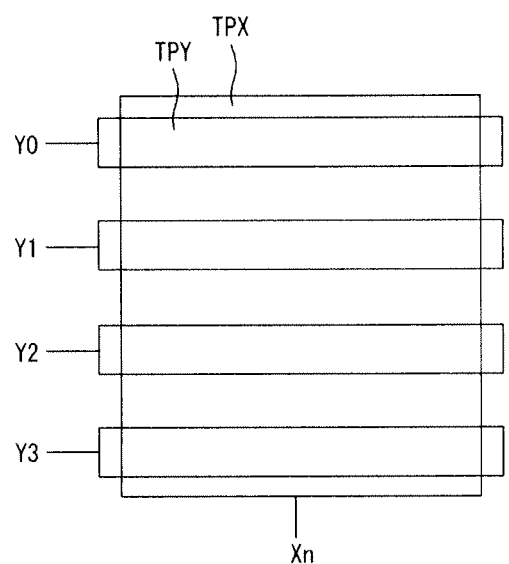

Referring to FIG. 8, the transparent electrodes TPY and TPX comprise first transparent electrodes TPY arranged so as to be divided in a first axial direction and second transparent electrodes TPX arranged in common with the first transparent electrodes TPY. The first transparent electrodes TPY and the second transparent electrodes TPX may be patterned to be disposed on different layers so as to cross each other. The first transparent electrodes TPY and the second transparent electrodes TPX are connected to the sensing unit TSC through lines Y0 . . . Y3 and Xn.

FIGS. 6 to 9 are merely illustrated to facilitate the understanding of the configuration of the transparent electrodes TPY and TPX, but the present invention is not limited thereto.

Now, the organic light emitting diode display according to one exemplary embodiment of the present invention will be described in more details.

First Exemplary Embodiment

Figure 10:
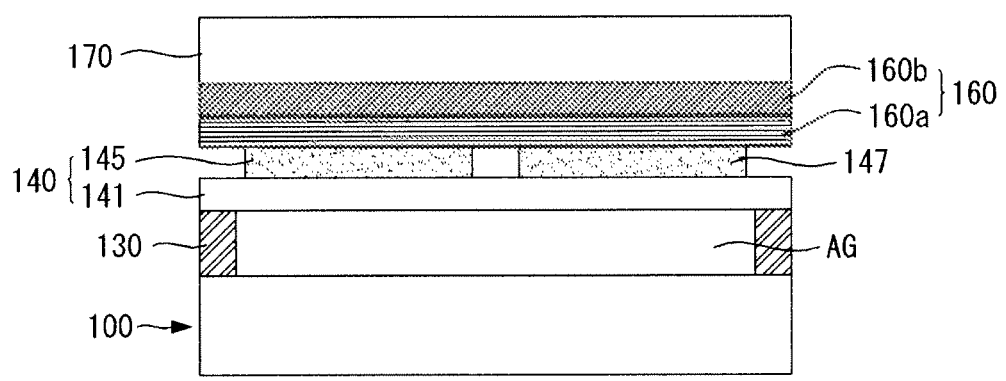
FIG. 10 is a cross-sectional view of an organic light emitting diode display according to a first exemplary embodiment of the present invention.
Figure 11:
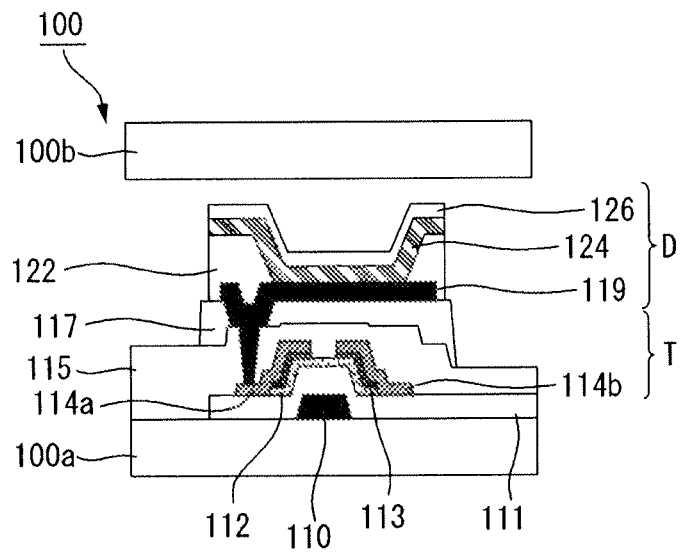
FIG. 11 is a partial cross-sectional view of a display panel.

Referring to FIGS. 10 and 11, an organic light emitting diode display according to a first exemplary embodiment of the present invention comprises a display panel 100, a touch screen panel 140 disposed on a display surface of the display panel 100, a polarizing plate 160 disposed on the touch screen panel 140, and a cover window 170 disposed on the polarizing plate 160.

Each of subpixels included in the display panel 100 comprises a switching transistor driven by a scan signal, a capacitor storing a data signal as a data voltage, a driving transistor driven by the data voltage stored in the capacitor, and an organic light emitting diode emitting light upon driving of the driving transistor. When the scan signal and the data signal are supplied to the subpixels, the subpixels emit light and the display panel 100 displays the corresponding image. An example of a subpixel included in the display panel 100 will be described below.

A gate 110 is disposed on one surface of a first substrate 100a. The gate 110 The gate 112 may be made of one selected from the group consisting of molybdenum Mo, aluminum Al, chrome Cr, gold Au, titanium Ti, nickel Ni, neodymium Nd, copper Cu, and alloy thereof. The gate 110 may be a multilayer formed of one selected from the group consisting of molybdenum Mo, aluminum Al, chrome Cr, gold Au, titanium Ti, nickel Ni, neodymium Nd, copper Cu, and alloy thereof. The gate 110 may be also a dual layer of molybdenum/aluminum-neodymium or molybdenum/aluminum.

A first insulation layer 111 is disposed on the gate 110. The first insulation layer 111 may be made of a silicon oxide layer SiOx, a silicon nitride layer SiNx, or may be a multilayer thereof. However, the first insulation layer 111 is not limited thereto.

An active layer 112 is disposed on the first insulation layer 111. The active layer 112 may comprise amorphous silicon or polycrystalline silicon which is crystallized amorphous silicon. The active layer 112 may comprise a source area, a channel area, and a drain area. Also, an ohmic contact layer 113 may be disposed on the active layer 112.

A source 114a and a drain 114b to be respectively connected to the source and drain areas are disposed on the ohmic contact layer 113. The source 114a and the drain 114b may be formed as a single layer or a multilayer. If the source 114a and the drain 114b are a single layer, the source 114a and the drain 114b may be made of one selected from the group consisting of molybdenum (Mo), aluminum (Al), chrome (Cr), gold (Au), titanium (Ti), nickel (Ni), neodymium (Nd), copper (Cu), and alloy thereof. If the source 114a and the drain 114b are a multilayer, the source 114a and the drain 114b may be a dual layer of molybdenum/aluminum-neodymium or molybdenum/aluminum, or a triple layer of molybdenum/aluminum-neodyminum/molybdenum.

A second insulation layer 115 is disposed on the source 114a and the drain 114b. The second insulation layer 115 may be a silicon oxide layer SiOx, a silicon nitride layer SiNx, or a multilayer thereof. However, the second insulation layer 115 is not limited thereto.

A third insulation layer 117 is disposed on the second insulation layer 115. The third insulation layer 117 may be a silicon oxide layer SiOx, a silicon nitride layer SiNx, or a multilayer thereof. However, the third insulation layer 117 is not limited thereto.

A lower electrode 119 connected to the source 114a or the drain 114b is disposed on the third insulation layer 117. The lower electrode 119 may be selected as a cathode or anode. If the lower electrode 119 is selected as a cathode, the cathode may be formed of one of aluminum, an aluminum alloy, and aluminum-neodymium AlNd. However, the lower electrode 119 is not limited thereto. If the lower electrode 119 is selected as a cathode, the cathode may be advantageously formed of a highly reflective material.

A bank layer 122 having an opening for exposing a part of the lower electrode 119 is formed on the lower electrode 119. The bank layer 122 may comprise organic material such as benzocyclobutene (BCB) resin, acrylic resin, or polyimide resin. However, the bank layer 122 is not limited thereto.

Figure 12:
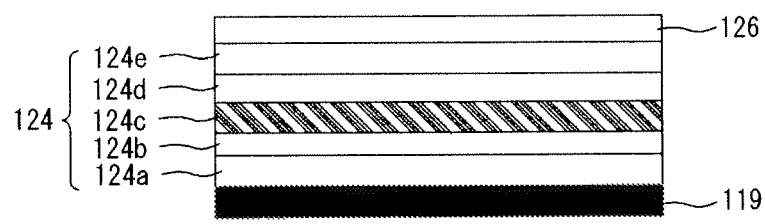
FIG. 12 is a view showing a hierarchical structure of an organic light emitting diode.

An organic light emitting layer 124 is disposed on the lower electrode 119. As shown in FIG. 12, the organic light emitting layer 124 may comprise a hole injection layer 124a, a hole transport layer 124b, an emission layer 124c, an electron transport layer 124d, and an electron injection layer 124e. The hole injection layer 124a makes the injection of holes smooth.

The hole injection layer 124a may be made of one selected from the group consisting of CuPc(cupper phthalocyanine), PEDOT(poly(3,4)-ethylenedioxythiophene), PANI(polyaniline), and NPD(N,N-dinaphthyl-N,N'-diphenyl benzidine). However, the hole injection layer 124a is not limited thereto. The hole transport layer 124b makes the transport of holes smooth. The hole transport layer 124b may be made of one selected from the group consisting of NPD(N,N-dinaphthyl-N,N'-diphenyl benzidine), TPD(N,N'-bis-(3-methylphenyl)-N,N'-bis-(phenyl)-benzidine), s-TAD, and MTDATA(4,4',4"-Tris(N-3-methylphenyl-N-phenyl-amino)-triphenylamine). However, the hole transport layer 124b is not limited thereto. The emission layer 124c may comprise material that emits red, green, or blue light. Also, the emission layer 124c may be made of phosphorescent or fluorescent material. If the emission layer 124c is red, the emission layer 124c may be made of phosphorescent material including a host having carbazole biphenyl (CBP) or 1,3-bis(carbazol-9-yl) mCP and a dopant having at least one selected from the group consisting of PIQIr(acac)(bis(1-phenylisoquinoline)acetylacetonate iridium), PQIr(acac)(bis(1-phenylquinoline)acetylacetonate iridium), PQIr(tris(1-phenylquinoline)iridium), and PtOEP (octaethylporphyrin platinum). Also, the emission layer 124c may be made of fluorescent material having PBD:Eu(DBM) 3(Phen) or Perylene. However, the emission layer 124c is not limited thereto. If the emission layer 124c is green, the emission layer 124c may be made of phosphorescent material including a host having CBP or mCP and a dopant having Ir(ppy)3(fac tris(2-phenylpyridine)iridium). Alternatively, the emission layer 124c may be made of a fluorescent material having Alq3(tris(8-hydroxyquinolino)aluminum). However, the emission layer 124c is not limited thereto. If the emission layer 124c is blue, the emission layer 124c may be made of phosphorescent material including a host having CBP or mCP and a dopant having (4,6-F2ppy)2Irpic. Alternatively, the emission layer 124c may be made of fluorescent material having one selected from the group consisting of spiro-DPVBi, spiro-6P, distryrylbenzene (DSB), distyryl arylene (DSA), PFO polymer, and PPV polymer. However, the emission layer 124c is not limited thereto. The electron transport layer 124d makes the transport of electrons smooth and may be made of one or more selected from the group consisting of Alq3(tris(8-hydroxyquinolino)aluminum), PBD, TAZ, spiro-PBD, BAlq, LiF, or SAlq. However, the electron transport layer 124d is not limited thereto. The electron injection layer 124e makes the injection of electron smooth and may be made of tris(8-hydroxyquinolino)aluminum (Alq3), PBD, TAZ, spiro-PBD, BAlq, LiF, or SAlq. However, the electron injection layer 124e is not limited thereto. Here, the present invention is not limited to FIG. 12, and at least one of the hole injection layer 124a, the hole transport layer 124b, the electron transport layer 124d, and the electron injection layer 124e may be omitted.

An upper electrode 126 is disposed on the organic light emitting layer 124. The upper electrode 126 may be selected as an anode or cathode. Here, the upper electrode 126 selected as the anode may be formed of one of Indium Tin Oxide (ITO), Indium Zinc Oxide (IZO), Indium Tin Zinc Oxide (ITZO), and ZnO doped Al2O3. However, the upper electrode 126 is not limited thereto.

With this structure, subpixels are disposed in matrix on one surface of the first substrate 100a. The subpixels disposed on one surface of the first substrate 100a are weak to moisture or oxygen. Therefore, the first substrate 100a and a second substrate 100b may be bonded and sealed by an adhesive member or the like.

The touch screen panel 140 comprises to a base substrate 141 and first and second transparent electrodes 145 and 147 connected and the sensing unit. The base substrate 141 may be made of material, e.g., glass, having a refractive index range from 1.1 to 1.6. The first and second transparent electrodes 145 and 147 are formed on a first surface of the base substrate 141 not facing the display surface of the display panel 100. The first and second transparent electrodes 145 and 147 are connected to the sensing unit through different lines from each other, and at least two pairs of the electrodes constitute one group. The first and second transparent electrodes 145 and 147 may be formed as a single-layer structure on the first surface of the base substrate 141 and have such shapes as those of "TPL" and "TPR" of FIGS. 3 and 4. However, the first and second transparent electrodes 145 and 147 are not limited thereto. The touch screen panel 140 is attached onto the display surface of the display panel by an optical adhesive 130 disposed on the outer edges of the base substrate and of the display surface of the display panel 100. The touch screen panel 140 is attached to the display surface area of the display panel 100 with an air layer AG provided therebetween. However, the touch screen panel 140 is not limited thereto.

The polarizing plate 160 comprises a phase difference delay film 160a disposed on the touch screen panel 140 and a polarizing film 160b disposed on the phase difference delay film 160a. The phase difference delay film 160a may have an optical axis having a phase difference of $\lambda/4$ with respect to incident light, and the polarizing film 160b may have an absorption axis for polarizing unpolarized light.

Second Exemplary Embodiment

Figure 13:
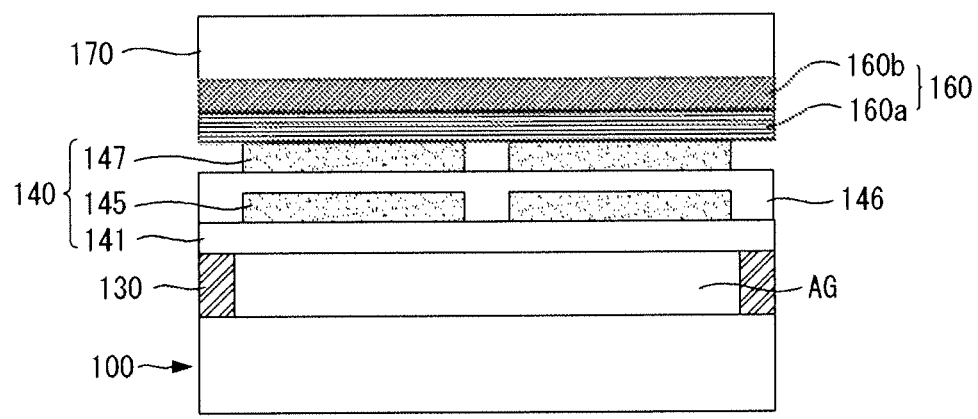
FIG. 13 is a cross-sectional view of an organic light emitting diode display according to a second exemplary embodiment of the present invention.

Referring to FIG. 13, an organic light emitting diode display according to a second exemplary embodiment of the present invention comprises a display panel 100, a touch screen panel 140 disposed on a display surface of the display panel 100, a polarizing plate 160 disposed on the touch screen panel 140, and a cover window 170 disposed on the polarizing plate 160.

The configurations of the display panel 100, the polarizing plate 160, and the cover window 170 of the second exemplary embodiment are the same the first exemplary embodiment except for the structure of the touch screen panel 140. Accordingly, only the structure of the touch screen panel 140 will be described in order to avoid redundant explanation.

The touch screen panel 140 comprises a base substrate 141 and first and second transparent electrodes 145 and 147 connected to the sensing unit. The base substrate 141 may be made of material, e.g., glass, having a refractive index range from 1.1 to 1.6. The touch screen panel 140 comprises the first transparent electrodes 145 formed on a first surface of the base substrate 141 not facing the display surface of the display panel 100, an insulation layer 146 formed on the first transparent electrodes 145, and the second transparent electrodes 147 formed on the insulation layer 146. The first and second transparent electrodes 145 and 147 are connected to the sensing unit through different lines from each other, and at least two electrode pairs constitute one group. The first and second transparent electrodes 145 and 147 may be formed as a multi-layer structure in which they are separated on the first surface of the base substrate 141 and on the insulation layer 146 and have such shapes as those of "TPL" and "TPR" of FIGS. 6 to 9. However, the first and second transparent electrodes 145 and 147 are not limited thereto. The touch screen panel 140 is attached onto the display surface of the display panel by an optical adhesive 130 disposed on the outer edges of the base substrate 141 and of the display surface of the display panel 100. The touch screen panel 140 is attached with an air layer AG provided in the display surface area of the display panel 100. However, the touch screen panel 140 is not limited thereto.

Third Exemplary Embodiment

Figure 14:
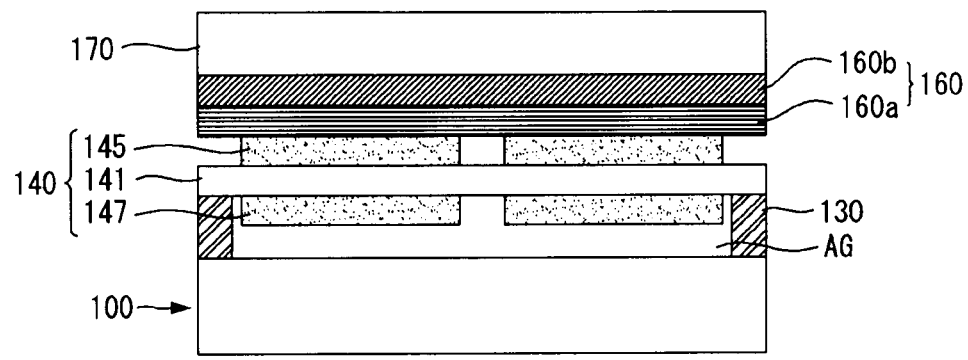
FIG. 14 is a cross-sectional view of an organic light emitting diode display according to a third exemplary embodiment of the present invention.

Referring to FIG. 14, an organic light emitting diode display according to a third exemplary embodiment of the present invention comprises a display panel 100, a touch screen panel 140 disposed on a display surface of the display panel 100, a polarizing plate 160 disposed on the touch screen panel 140, and a cover window 170 disposed on the polarizing plate 160.

The configurations of the display panel 100, the polarizing plate 160, and the cover window 170 of the third exemplary embodiment are the same the first exemplary embodiment except for the structure of the touch screen panel 140. Accordingly, only the structure of the touch screen panel 140 will be described in order to avoid redundant explanation.

The touch screen panel 140 comprises a base substrate 141 and first and second transparent electrodes 145 and 147 connected to the sensing unit. The base substrate 141 may be made of material, e.g., glass, having a refractive index range from 1.1 to 1.6. The touch screen panel 140 comprises the first transparent electrodes 145 formed on a first surface of the base substrate 141 not facing the display surface of the display panel 100 and the second transparent electrodes 147 formed on a second surface of the base substrate 141 facing the display surface of the display panel 100. The first and second transparent electrodes 145 and 147 are connected to the sensing unit through different lines from each other, and at least two electrode pairs constitute one group. The first and second transparent electrodes 145 and 147 may be formed as a multi-layer structure in which they are separated on the first surface and second surface of the base substrate 141 and have such shapes as those of "TPL" and "TPR" of FIGS. 6 to 9. However, the first and second transparent electrodes 145 and 147 are not limited thereto. The touch screen panel 140 is attached onto the display surface of the display panel by an optical adhesive 130 disposed on the outer edges of the base substrate 141 and of the display surface of the display panel 100. The touch screen panel 140 is attached with an air layer AG provided in the display surface area of the display panel 100. However, the touch screen panel 140 is not limited thereto.

Fourth Exemplary Embodiment

Figure 15:
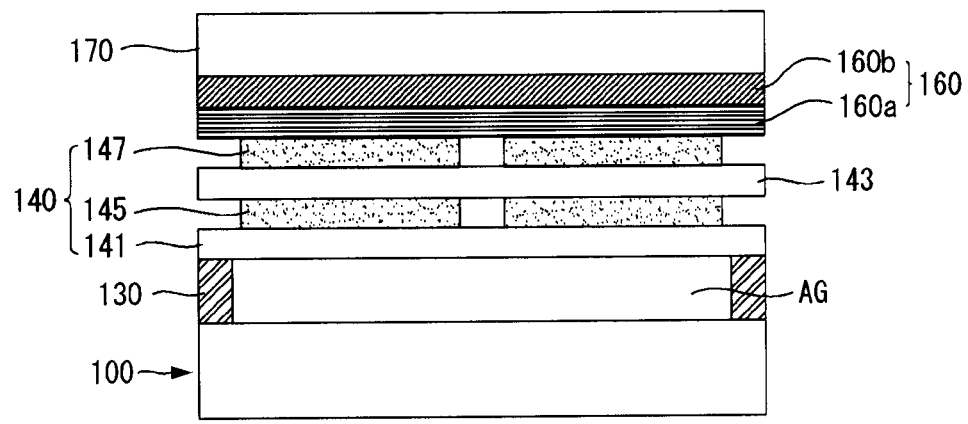
FIG. 15 is a cross-sectional view of an organic light emitting diode display according to a fourth exemplary embodiment of the present invention.

Referring to FIG. 15, an organic light emitting diode display according to a fourth exemplary embodiment of the present invention comprises a display panel 100, a touch screen panel 140 disposed on a display surface of the display panel 100, a polarizing plate 160 disposed on the touch screen panel 140, and a cover window 170 disposed on the polarizing plate 160.

The configurations of the display panel 100, the polarizing plate 160, and the cover window 170 of the fourth exemplary embodiment are the same the first exemplary embodiment except for the structure of the touch screen panel 140. Accordingly, only the structure of the touch screen panel 140 will be described in order to avoid redundant explanation.

The touch screen panel 140 comprises a first base substrate 141 and first and second transparent electrodes 145 and 147 connected to the sensing unit. The first base substrate 141 may be made of material, e.g., glass, having a refractive index range from 1.1 to 1.6. The touch screen panel 140 comprises the first transparent electrodes 145 formed on a first surface of the first base substrate 141 not facing the display surface of the display panel 100, a second base substrate 143 attached to the first surface of the first base substrate 141, and the second transparent electrodes 147 formed on a second surface of the second base substrate 143 not facing the first transparent electrodes 145. The first and second transparent electrodes 145 and 147 are connected to the sensing unit through different lines from each other, and at least two electrode pairs constitute one group. The first and second transparent electrodes 145 and 147 may be formed as a multi-layer structure in which they are separated on the first surface and second surface of the first base substrate 141 and have such shapes as those of "TPL" and "TPR" of FIGS. 6 to 9. However, the first and second transparent electrodes 145 and 147 are not limited thereto. The touch screen panel 140 is attached onto the display surface of the display panel by an optical adhesive 130 disposed on the outer edges of the base substrate 141 and of the display surface of the display panel 100. The touch screen panel 140 is attached with an air layer AG provided in the display surface area of the display panel 100. However, the touch screen panel 140 is not limited thereto.

Now, the characteristics of the organic light emitting diode display according to the present invention will be described with reference to one of the foregoing exemplary embodiments and a comparative example.

Figure 16:
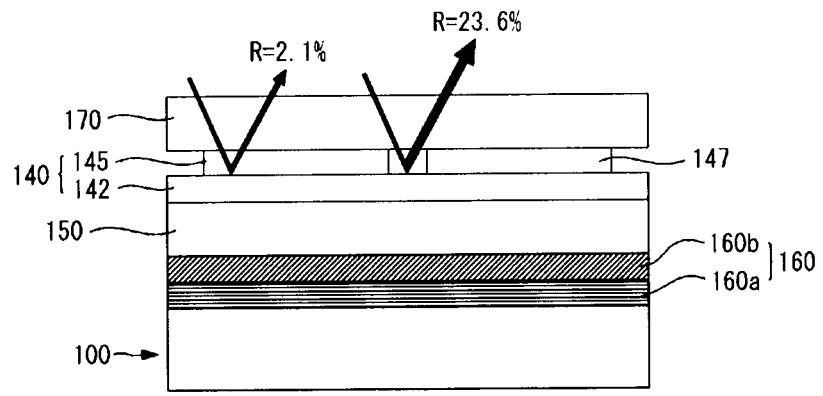
FIG. 16 is a cross-sectional view of an organic light emitting diode display according to a comparative example of the related art.
Figure 17:
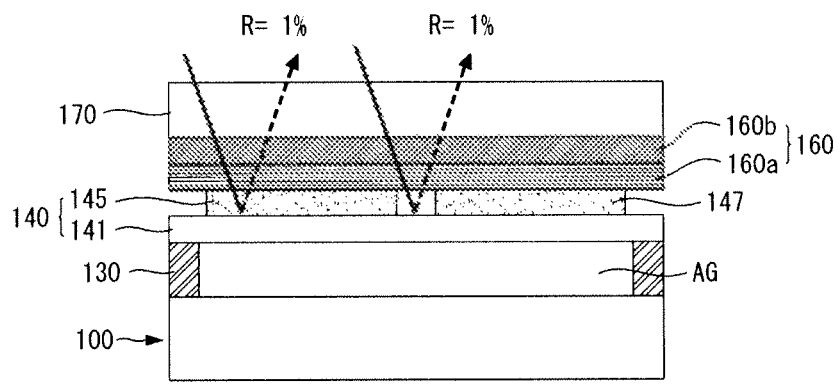
FIG. 17 is a cross-sectional view of an organic light emitting diode display according to an exemplary embodiment of the present invention.

Referring to FIGS. 16 and 17, organic light emitting diode displays according to the comparative example and the exemplary embodiment each comprise a display panel 100, a touch screen panel 140, a polarizing plate 160, and a cover window 170.

Referring to FIG. 16, the structure of the touch screen panel 140 of the comparative example will be described below.

The polarizing plate 160 comprising a phase difference delay film 160*a* and a polarizing film 160*b* is attached to the entire surface of the display surface of the display panel 100. The touch screen panel 140 is attached by an optical filler 150 formed on the entire surface of the polarizing plate 160. The cover window 170 is attached to the entire surface of the touch screen panel 140. The touch screen panel 140 comprises a base substrate 142 formed of polyethylene terephthalate (PET) and first and second transparent electrodes 145 and 147 formed as a single-layer structure on the base substrate 142.

Referring to FIG. 17, the structure of the touch screen panel 140 of the exemplary embodiment will be described below.

The touch screen panel 140 is attached to the display surface area of the display panel 100 by an optical filler 130 formed on outer edges of the display panel 100 so as to provide an air layer AG. A polarizing plate 160 comprising a phase difference delay film 160*a* and a polarizing film 160*b* is attached onto the touch screen panel 140. The touch screen panel 140 comprises a base substrate 141 formed of glass and first and second transparent electrodes 145 and 147 formed as a single-layer structure on the base substrate 141.

The following results were obtained after external light is shone on the comparative example and the exemplary embodiment having the above-described structures.

First, in the comparative example of FIG. 16, when light was incident from the outside, it was observed that the incident light was reflected back upon hitting the surface of the base substrate 142, as well as the area where the first and second transparent electrodes 145 and 147 are formed. At this time, the reflectance R of the light incident from the outside was approximately 2.1%. Moreover, in the area where the first and second transparent electrodes 145 and 147 constituting the touch screen panel 140 are not formed, it was observed that the light was directly reflected upon hitting the surface of the base substrate 142. At this time, the reflectance R of the light incident from the outside was approximately 23.6%.

The structure of the comparative example is degraded in visibility because when light is incident from the outside, a considerable amount of the light is reflected back after hitting the first and second transparent electrodes 145 and 147 or the surface of the base substrate 142. Also, there arises the problem that the first and second transparent electrodes 145 and 147 constituting the touch screen panel 140 are visible to the user due to the amount of reflected light. It is assumed that this is because of the structural problems of the polarizing plate 160, optical filler 150, touch screen panel 140, and cover window 170 disposed on the display panel 100.

On the other hand, in the exemplary embodiment of FIG. 17, in the exemplary embodiment of FIG. 17, when light is incident from the outside, it was observed that the incident light was reflected upon hitting the surface of the base substrate 141, as well as the area where the first and second transparent electrodes 145 and 147 are formed. At this time, the reflectance R of the light incident from the outside was approximately 1%. Moreover, in the area where the first and second transparent electrodes 145 and 147 constituting the touch screen panel 140 are not formed, it was observed that the light was directly reflected upon hitting the surface of the base substrate 141. At this time, the reflectance R of the light incident from the outside was approximately 1%.

The structure of the exemplary embodiment is configured such that even if light is incident from the outside, almost all of the external light is prevented from being reflected, thus improving visibility and eliminating the problem that the first and second transparent electrodes 145 and 147 constituting the touch screen panel 140 are visible to the user. That is, the exemplary embodiment solved the problem of the comparative example because the polarizing plate 160 is disposed between the touch screen panel 140 and the cover window 170.

Figure 18:
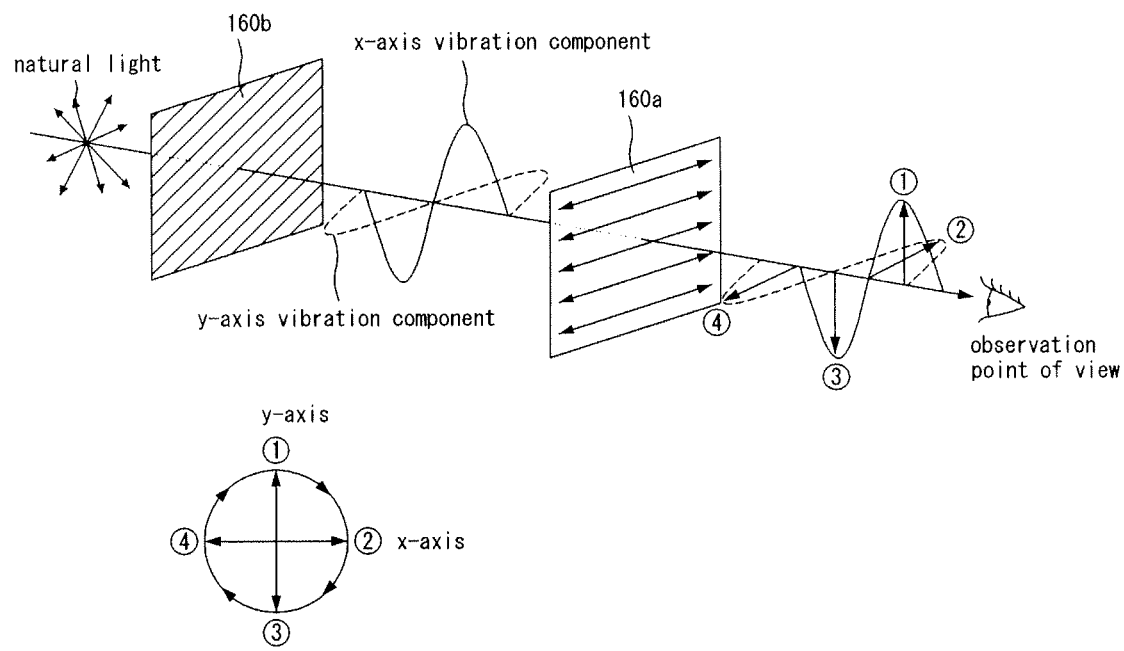
FIGS. 18 and 19 are views for explaining the characteristics of the organic light emitting diode display according to the exemplary embodiment of the present invention.

Referring to FIG. 18, when unpolarized natural light is incident, the polarizing plate 160 polarizes the light into an x-axis vibration component and a y-axis vibration component along the absorption axis of the polarizing film 160*b*. Afterwards, the light polarized into the respective vibration components, the x-axis vibration component becomes slower than the y-axis vibration component by $\lambda/4$. When viewed from the observation point, the light incident through the phase difference delay film 160*a* has the characteristic that it vibrates in the directions of □, □, □, and □.

Figure 19:
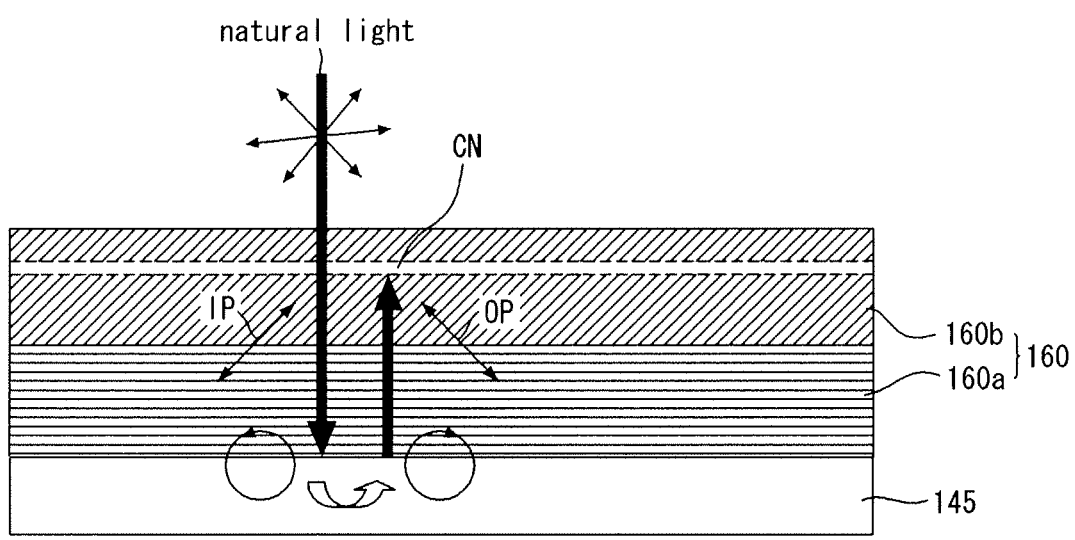

Referring to FIG. 19, in the exemplary embodiment, the polarizing plate 160 is disposed between the touch screen panel 140 and the cover window 170 by using the aforementioned characteristic of the polarizing plate 160. Thus, in the structure of the exemplary embodiment, when natural light (or external light) is incident, the incident light is polarized in the "IP" direction by the phase difference delay film 160*a* of the polarizing plate 160 and becomes slower by $\lambda/4$. The light reflected by the transparent electrodes 145 disposed below the polarizing plate 160 is polarized in the "OP" direction and becomes slower by $\lambda/4$ as it passes again through the phase difference delay film 160*a* of the polarizing plate 160. At this time, the reflected light is polarized in the "OP" direction but is not transmitted through a "crossed nicole (CN)" formed on the absorption axis of the polarizing film 160*b*. That is, the natural light (or external light) incident through the polarizing plate 160 is reflected and brought back as if it passed through a plate of $\lambda/4+\lambda/4=\lambda/2$. Since the $\lambda/2$ plate changes a polarization state to 90 degrees, the natural light (or external light) incident through the polarizing plate 160 is not transmitted through the "CN" formed on the absorption axis of the polarizing film 160b but almost the entire amount thereof is lost.

Meanwhile, in the exemplary embodiment, the reflectance of the incident external light is reduced using the polarizing plate 160 comprising the phase difference delay film 160a and the polarizing film 160b. However, according to an experiment, it was found that, when the light incident from the outside showed a reflectance R of 0.1% to 4%, there were no problems, such as exposure of the transparent electrodes 145 and 147 and degradation in visibility.

The following Table 1 schematically shows whether the transparent electrodes were observed or not and whether the visibility was degraded or not with respect to the reflectance of the light incident from the outside according to the characteristics of the polarizing plate 160.

TABLE 1

| Reflectance (R) | Transparent electrodes | visibility |
| --- | --- | --- |
| 0.1% | Not observed | Not degraded |
| 1% | Not observed | Not degraded |
| 4% | Not observed | Not degraded |
| 5% | Partially observed | Partially degraded |
| 6% | Observed | Degraded |

According to the above Table 1, the polarizing plate 160 may be configured to have a reflectance R of 0.1% to 4% as the light incident from the outside is reflected upon hitting the surfaces of the transparent electrodes 145 and 147 included in the touch screen panel 140. If the reflectance R of the polarizing plate 160 is maintained to be higher than 0.1%, this prevents the problem of exposure of the transparent electrodes 145 and 147 due to a difference in reflected light caused by the difference in refractive index between the area in which the transparent electrodes are formed and an area in which no transparent electrodes are formed. If the reflectance R of the polarizing plate 160 is maintained to be lower than 4%, this prevents the problem of degradation in visibility due to the difference in reflected light caused by the difference in refractive index between the area in which the transparent electrodes are formed and an area in which no transparent electrodes are formed. Therefore, if the component disposed on the touch screen panel 140 is configured to have a reflectance R of 0.1% to 4%, the component can be replaced by an optical plate having a different configuration from the polarizing plate 160.

As described above, during the manufacture of the organic light emitting diode display with the touch screen function, the phenomenon that the transparent electrodes constituting the touch screen panel are visible to the user is eliminated, and the visibility of the display panel can be improved.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. An organic light emitting diode display comprising:
    a display panel;
    a touch screen panel disposed on a display surface of the display panel;
    a sensing unit for sensing a position through the touch screen panel; and
    a polarizing plate disposed on the touch screen panel,
    wherein the touch screen panel is attached to a display surface area of the display panel with an air layer,
    wherein the touch screen panel comprises:
    a base substrate attached onto the display surface of the display panel; and
    transparent electrodes formed on a first surface of the base substrate not facing the display surface of the display panel,
    wherein the air layer is disposed between the display surface of the display panel and the base substrate facing the display surface of the display panel.

2. The organic light emitting diode display of claim 1, wherein the polarizing plate comprises:
    a phase difference delay film disposed on the touch screen panel; and
    a polarizing film disposed on the phase difference delay film.

3. The organic light emitting diode display of claim 2, wherein the phase difference delay film has an optical axis having a phase difference of $\lambda/4$ with respect to incident light.

4. The organic light emitting diode display of claim 1, wherein the base substrate is made of glass.

5. The organic light emitting diode display of claim 1, wherein the polarizing plate has a reflectance of 0.1% to 4% as the light incident from the outside is reflected upon hitting the surfaces of the transparent electrodes included in the touch screen panel.

6. The organic light emitting diode display of claim 1, wherein the touch screen panel comprises:
    a base substrate attached onto the display surface of the display panel; and
    transparent electrodes formed on a first surface of the base substrate not facing the display surface of the display panel, and connected to the sensing unit through different lines from each other, at least two pairs of the electrodes constituting one group.

7. The organic light emitting diode display of claim 1, wherein the touch screen panel comprises:
    a base substrate attached onto the display surface of the display panel;
    first transparent electrodes formed on a first surface of the base substrate not facing the display surface of the display panel;
    an insulation layer formed on the first transparent electrodes; and
    second transparent electrodes formed on the insulation layer,
    wherein the first and second transparent electrodes are connected to the sensing unit through different lines from each other.

8. The organic light emitting diode display of claim 1, wherein the touch screen panel comprises:
    a base substrate attached onto the display surface of the display panel;
    first transparent electrodes formed on a first surface of the base substrate not facing the display surface of the display panel; and second transparent electrodes formed on a second surface of the base substrate facing the display surface of the display panel, wherein the first and second transparent electrodes are connected to the sensing unit through different lines from each other.

9. The organic light emitting diode display of claim 1, wherein the touch screen panel comprises:
- a first base substrate attached onto the display surface of the display panel;
- first transparent electrodes formed on a first surface of the base substrate not facing the display surface of the display panel; and
- a second base substrate attached onto the first surface of the first base substrate; and
- second transparent electrodes formed on a first surface of the second base substrate not facing the first transparent electrodes, wherein the first and second transparent electrodes are connected to the sensing unit through different lines from each other.

10. A manufacturing method of an organic light emitting diode display, the method comprising:
- forming a display panel;
- forming a touch screen panel on a display surface of the display panel;
- forming a sensing unit to sense a position through the touch screen panel; and
- forming a polarizing plate on the touch screen panel, wherein the touch screen panel is attached to the display surface area of the display panel with an air layer, wherein the touch screen panel comprises:
- a base substrate attached onto the display surface of the display panel; and
- transparent electrodes formed on a first surface of the base substrate not facing the display surface of the display panel, wherein the air layer is disposed between the display surface of the display panel and the base substrate facing the display surface of the display panel.

11. The method of claim 10, wherein the polarizing plate comprises:
- a phase difference delay film disposed on the touch screen panel; and
- a polarizing film disposed on the phase difference delay film.

12. The method of claim 11, wherein the phase difference delay film has an optical axis having a phase difference of $\lambda/4$ with respect to incident light.

13. The method of claim 10, wherein the base substrate is made of glass.

14. The method of claim 10, wherein the polarizing plate has a reflectance of 0.1% to 4% as the light incident from the outside is reflected upon hitting a surfaces of the transparent electrodes included in the touch screen panel.

15. The method of claim 10, wherein the transparent electrodes is connected to the sensing unit through different lines from each other, at least two pairs of a electrodes constituting one group.

16. The method of claim 10, wherein the touch screen panel comprises:
- a base substrate attached onto the display surface of the display panel;
- first transparent electrodes formed on a first surface of the base substrate not facing the display surface of the display panel;
- an insulation layer formed on the first transparent electrodes; and
- second transparent electrodes formed on the insulation layer, wherein the first and second transparent electrodes are connected to the sensing unit through different lines from each other.

17. The method of claim 10, wherein the touch screen panel comprises:
- a base substrate attached onto the display surface of the display panel;
- first transparent electrodes formed on a first surface of the base substrate not facing the display surface of the display panel; and
- second transparent electrodes formed on a second surface of the base substrate facing the display surface of the display panel, wherein the first and second transparent electrodes are connected to the sensing unit through different lines from each other.

18. The method of claim 10, wherein the touch screen panel comprises:
- a first base substrate attached onto the display surface of the display panel;
- first transparent electrodes formed on a first surface of the base substrate not facing the display surface of the display panel; and
- a second base substrate attached onto the first surface of the first base substrate; and
- second transparent electrodes formed on a first surface of the second base substrate not facing the first transparent electrodes, wherein the first and second transparent electrodes are connected to the sensing unit through different lines from each other.

* * * * *